May 10, 1955 E. R. SEWELIN ET AL 2,708,133
CAB MOUNTING – TORSION SPRING TYPE
Filed Dec. 22, 1950 2 Sheets-Sheet 1
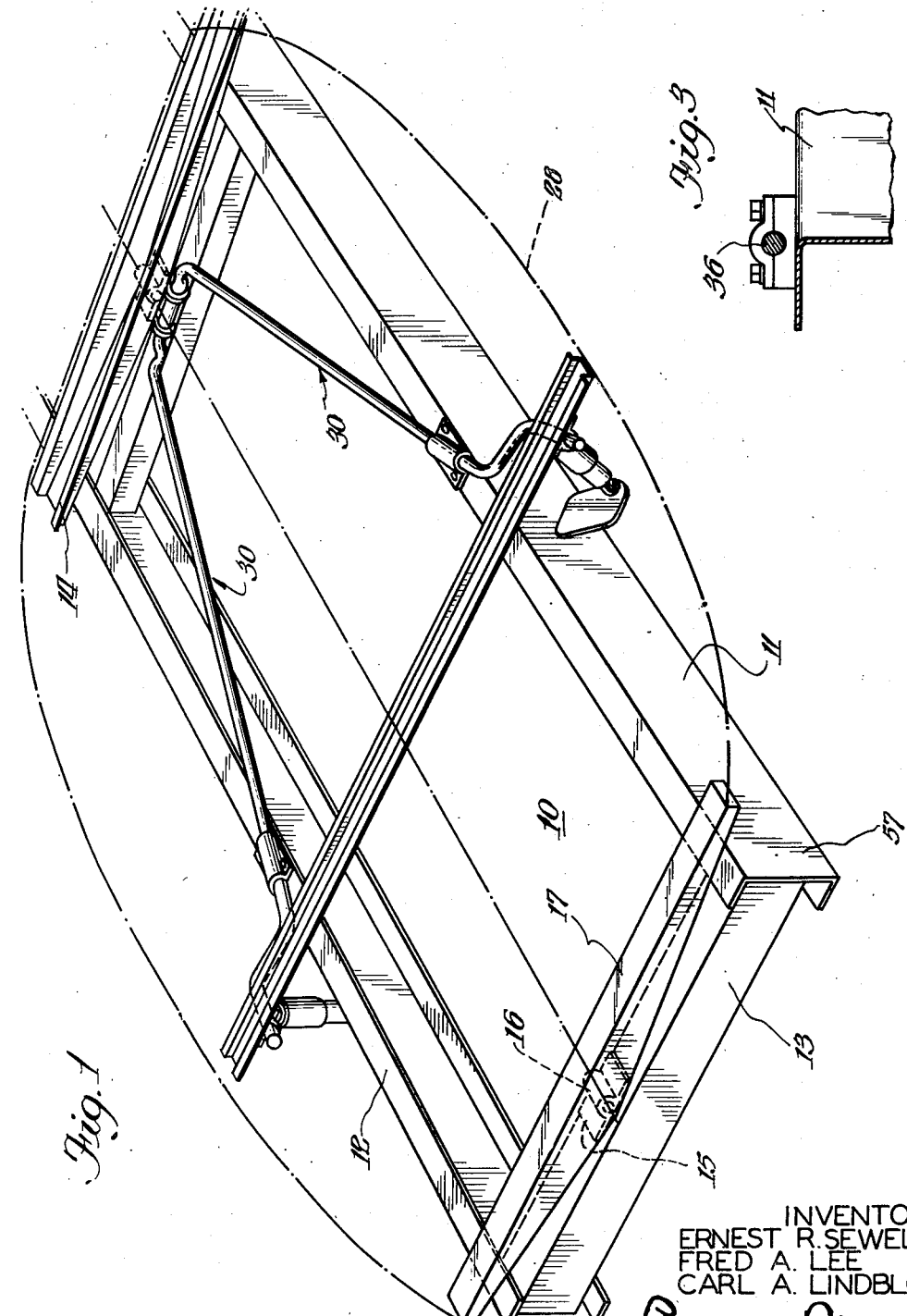
INVENTORS
ERNEST R. SEWELIN
FRED A. LEE
CARL A. LINDBLOM
Paul O. Pippel
ATT'Y

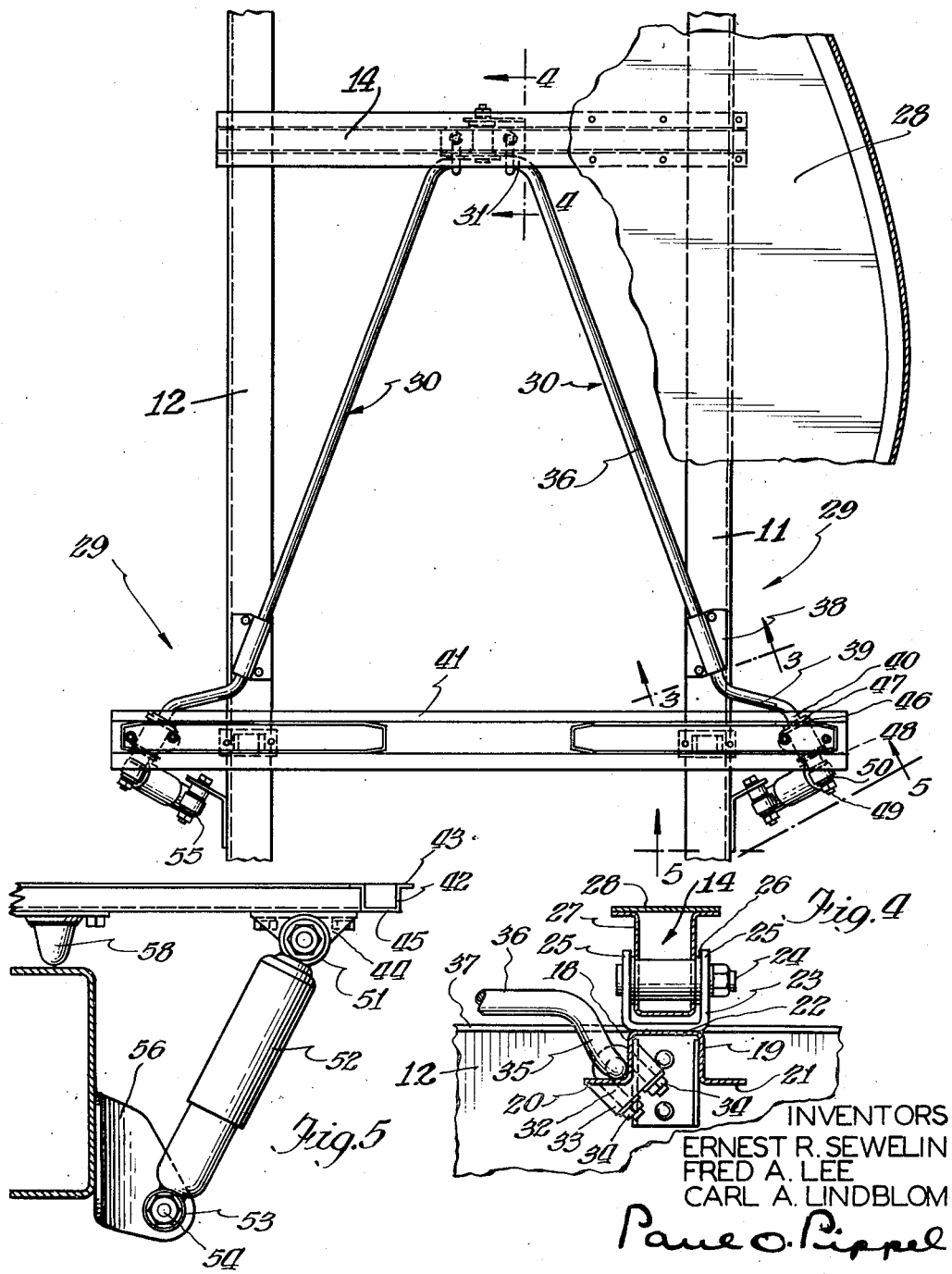

United States Patent Office 2,708,133
Patented May 10, 1955

2,708,133

CAB MOUNTING—TORSION SPRING TYPE

Ernest R. Sewelin, Waterloo, Fred A. Lee, Fort Wayne, and Carl A. Lindblom, Auburn, Ind., assignors to International Harvester Company, a corporation of New Jersey Application December 22, 1950, Serial No. 202,355

8 Claims. (Cl. 296—35)

This invention relates to a body mounting structure for automotive vehicles and more particularly to a new and improved vehicle cab mounting structure for trucks or the like utilizing torsion rod springs for permitting limited flexibility between the vehicle chassis frame and the cab.

In the operation of trucks or other vehicles designed for carrying heavy loads over an uneven terrain or road surface irregularities one or more ground engaging wheels are elevated differently from the other wheels causing the frame side sills to twist or weave. Hence, it is customary in present day truck design and construction to provide a chassis frame which is relatively flexible and capable of relieving the torsional forces imposed on the chassis frame by the distortion of the frame side sills. While the automotive engineers have effectively mitigated the damaging influence of these forces on the chassis frame by providing a flexible frame, the problem of mounting the vehicle cab on the flexible frame in such a manner so as to minimize the transfer of the destructive forces to the cab has not been entirely solved. It is, therefore, the primary objective of the present invention to provide a novel cab mounting structure which allows a limited relative movement between the cab and the chassis frame whereby the distorting forces and shocks to which the chassis frame is subjected are transmitted to a lesser degree to the cab than heretofore possible.

Another object is the provision of a two point mounting structure for vehicle cabs whereby the cab may rock laterally with respect to the chassis frame about an axis parallel to the longitudinal median line of the chassis frame.

Still another object is the provision of stabilizing devices including torsion rod springs for yieldably resisting lateral rocking of the cab with respect to the chassis frame.

A further object is the provision of a cab mounting structure by virtue of which the vehicle cab is not distorted although the chassis frame upon which it is mounted is subjected to torsional forces.

A still further object is to pivotally mount the cab on the chassis frame at two longitudinally spaced points, said points being disposed in a vertical plane passing through the longitudinal median line of the chassis frame where distortion of the frame by deflection of the side sills is least pronounced.

Still another object is to provide a pair of torsion rod springs for stabilizing the vehicle cab, each of the torsion rods having one end rigidly connected to the frame adjacent one end of the cab and its opposite end pivotally connected to a respective opposite side of the cab.

The foregoing and other important objects and desirable features inherent in and encompassed by the invention together with many of the purposes and uses thereof will become readily apparent from a reading of the ensuing description in conjunction with the annexed drawings, in which, Fig. 1 is a perspective view of the forward portion of a truck chassis frame taken from a point disposed angularly above the chassis frame;

Fig. 2 is a plan view of a chassis frame incorporating the invention; a portion of the vehicle cab is cut away to better illustrate the torsion rod stabilizing devices;

Fig. 3 is an enlarged sectional view taken substantially along line 3—3 of Fig. 2;

Fig. 4 is a sectional view taken substantially along line 4—4 of Fig. 2; and

Fig. 5 is fragmentary sectional view taken substantially along line 5—5 of Fig. 2.

Referring to the drawings in which like reference characters designate like elements throughout the various views there is shown the forward portion of a truck chassis frame 10. The chassis frame 10 comprises a pair of longitudinally extending, transversely spaced side sill members 11 and 12 having the conventional U-shaped form interconnected by a plurality of longitudinally spaced, transversely disposed cross members 13 and 14. The forward cross member 13, as shown somewhat diagrammatically in Fig. 1, has a bracket member 15 rigidly secured thereto midway between the side sill members 11, 12. The bracket member 15 has a longitudinally extending bearing portion 16 to which the central section of the forward U-shaped cab cross member 17 is pivotally connected. The outline of the sheet metal portion of the vehicle cab is shown in broken lines in Fig. 1.

The rearward cross member 14, as best shown in Figs. 2 and 4, is channel-shaped with the legs 18, 19 of the channel depending downwardly, the legs being provided with horizontal, oppositely projecting flanges 20, 21, respectively. Mounted on the web portion 22 of the cross member 14 centrally of the side sill members 11 and 12 and in longitudinal alignment with the bracket member 15 is a U-shaped bracket member 23. A pivot pin 24 is carried by the legs 25 of the bracket member 23. Positioned between the legs 25 and encircling the pivot pin 24 is an annular rubber bushing 26. The bushing 26 is rigidly secured to the rearward cab cross member 27 and permits relative movement between the cross member 27 and the pin 24 by deformation thereof. The floor panel 28 of the vehicle cab is secured to the cross members 17 and 27 by suitable means. It will be obvious from the above described structure that the bracket members 15 and 23 and their associated parts provide a longitudinal pivot axis for the entire vehicle cab, including the forward and rearward cab cross members 17 and 27, which is vertically spaced above the longitudinal median line of the chassis frame 10 and below the center of gravity of the cab.

Inasmuch as the vehicle cab is mounted for oscillation on a generally horizontal and longitudinal axis, resilient means are provided for stabilizing the cab and for preventing excessive rocking of the same. The illustrated stabilizing devices, designated generally by numeral 29, are in the form of torsion rod springs 30 symmetrically disposed on each side of the chassis frame 10. In view of the fact that both stabilizing devices 29 are structurally and functionally the same only the stabilizing structure on one side of the vehicle chassis frame 10 will be described in detail. The stabilizing device 29 positioned along side sill member 11 includes a torsion rod spring 30 having a short inwardly directed section 31 which is rigidly supported on the leg 18 and the flange 20 of the rearward cross member 14 by means of a U-bolt 32, anchor block 33, and the nuts 34. It is to be understood that the short section 31 of one stabilizing device 29 may be integrally formed with the comparable short section of the other stabilizing device instead of being made separable as shown without departing from the scope of the invention. The torsion rod spring 30 is formed with a forwardly, upwardly inclined portion 35, as best shown in Fig. 4, which joins a forwardly extending, outwardly directed horizontal section 36. It will be noted that the horizontal section 36 is spaced above the upper surface 37 of the side sill member 11. The horizontal section 36 diverges outwardly and is supported for rotation in a bearing member 38 rigidly secured to the upper surface 37 of the side sill member 11. Extending angularly, outwardly beyond the side sill member 11 is a vertical section 39 provided with a short connecting portion 40 parallel to the twisting axis of the horizontal section 36.

A third transversely extending vehicle cab cross member 41 longitudinally spaced between the forward and rearward cab cross members 17 and 27 is rigidly connected to the floor panel 28. The cross member 41 is channel-shaped, the legs 42 thereof being provided with flanges 43 for attachment to the cab and to strengthen the member. A depending bearing member 44 is rigidly attached to the web portion 45 of the cross member 41 adjacent the end thereof. Encircling a section of the connecting portion 40 is a rubber bushing or insulator 46 which is maintained within the bearing member 44 by retainer washers 47 and 48 to insulate the parts and to enable relative movement therebetween by deformation. The outer extremity 49 of the connecting portion 40 is provided with a second rubber bushing 50 to which one end 51 of a conventional telescopic type shock absorber 52 engages. The opposite end 53 of the shock absorber 52 is pivotally attached to a pivot pin 54 in a like manner by means of a rubber bushing 55 carried by the pin 54. A bracket member 56 rigidly fixed to the side sill member 11 supports the pivot pin 54 inwardly and below the connecting portion 40.

In normal operation of the truck over a comparatively level and smooth road bed the chassis frame twist is practically non-existent. The entire weight of the vehicle cab is supported by the forward and rearward frame cross members 13 and 14. The cab is maintained in a relatively fixed upright position with respect to the chassis frame 10 by the stabilizing devices 29. Twisting of the chassis frame 10 wherein one end of one of the side sill members is raised with respect to the other side sill member is effectively accommodated without imposing severe damaging strains on the sheet metal parts of the vehicle cab structure. As an example, if the forward end, indicated by numeral 57, of the side sill member 11 is suddenly displaced vertically upwardly with respect to the side sill member 12 the resulting force is not transmitted to the vehicle cab structure to torsionally distort the same. Bracket member 15 and the bearing portion 38 are raised a proportionately smaller distance by the displacement of the forward end 57 of the sill member 11. Inasmuch as bracket member 15 is in longitudinal alignment with the rear cab mounting structure and both the forward and rear cab mounting structures lie within a vertical plane containing the longitudinal median line of the chassis frame 10 substantial relative rocking movement between the vehicle cab and the chassis frame is permitted without materially distorting the vehicle cab. Movement of the bearing member 38 relatively upwardly toward the vehicle cab structure causes the connecting portion 40 of the torsion rod spring 30 positioned along side sill member 11 to move relatively upwardly twisting the horizontal section 36 of the spring 30 and compressing the shock absorber 52. It will be obvious that a minimum amount of road shock is transmitted to the cab structure by mounting the vehicle cab as described above. The damaging forces are effectively dissipated primarily by the torsion rod springs and secondarily by the shock absorbers 52. Once the vehicle has passed over the road bed irregularity the vehicle cab assumes its normal upright steadied position. In the event that the vehicle cab is rocked to an extreme position with reference to the chassis frame a pair of transversely spaced, downwardly depending rubber blocks 58 secured to the underside of the vehicle cab cross member 41 are adapted to abut the side sill members 11 and 12 to provide elastic stop limit means.

The embodiment of the invention chosen for the purposes of illustration and description herein is that preferred for achieving the objects of the invention and developing the utility thereof in the most desirable manner. It will be appreciated that the particular structural and functional aspects emphasized herein are not intend to exclude, but rather to suggest, such other adaptations and modifications of the invention as fall within the spirit and scope of the invention as defined in the appended claims.

What is claimed is:

1. In a motor vehicle having a longitudinal frame and a body, the combination including said frame and body comprising means for connecting said body to said frame for relative movement therebetween comprising means pivotally securing the longitudinally spaced opposite ends of said body to said frame whereby said body is capable of rocking laterally with respect to said frame about a longitudinal and horizontal axis vertically spaced above said frame; and means for yieldably resisting rocking of the body with respect to the frame including a pair of torsion springs, said springs having one end rigidly connected to said frame adjacent one end of said body, said torsion springs extending divergingly from said connections to said frame and being pivotally connected adjacent their opposite ends to the respective opposite sides of said body, the pivotal axes of said connections between said torsion springs and said body being disposed at an angle with respect to the longitudinal axis of said frame and lying in a horizontal plane vertically spaced above said frame, said torsion springs further being disposed at an angle with respect to said longitudinal rocking axis.

2. In a motor vehicle having a longitudinal frame and a body, the combination including said frame and body comprising means for connecting said body to said frame for controlled relative movement therebetween comprising means pivotally securing the longitudinally spaced opposite ends of said body to said frame whereby said body is capable of rocking laterally with respect to said frame about a longitudinal and horizontal axis vertically spaced above said frame; and means for yieldably resisting rocking of the body with respect to the frame including a pair of torsion rods, said rods having horizontal sections rigidly attached at one end thereof to said frame adjacent one end of said body, said horizontal sections extending divergingly from said connections to said frame and having their opposite ends terminating adjacent the respective opposite sides of said frame and being rotatably supported by said frame, said torsion rods further including means interconnecting the free ends of the horizontal sections with respective opposite sides of said body, said horizontal sections being disposed at an angle with respect to said longitudinal rocking axis.

3. The combination as set forth in claim 2, in which said means interconnecting the free ends of the horizontal sections with respective opposite sides of said body includes inclined sections extending outwardly and upwardly from the longitudinally extending axes of said horizontal sections.

4. The combination as set forth in claim 3, in which said inclined sections are pivotally attached to the respective opposite sides of said body and the pivotal axis of each pivotal connection of said body and said inclined section is parallel to a respective horizontal section.

5. The combination as set forth in claim 4, in which shock absorber means are provided for interconnecting said inclined sections to said frame.

6. In a motor vehicle having a frame comprising a pair of longitudinally extending, transversely spaced sill members interconnected by a pair of longitudinally spaced cross members; a vehicle body; means for supporting said body on said frame comprising first means pivotally connecting the forward end of said body to one of said cross members, said means being spaced substantially midway between said sill members; second means pivotally connecting the rearward end of said body to the other of said cross members, said second means being in longitudinal alignment with said first means whereby said body is capable of rocking laterally with respect to said frame; means for yieldably resisting rocking of the body with respect to the frame including a pair of torsion rods, said rods having horizontal sections; common connecting means rigidly securing one end of each horizontal section to one of said cross members adjacent the second means pivotally connecting the rearward end of said body to said cross member, said horizontal sections extending divergingly from said common connecting means, said horizontal sections being disposed at an angle with respect to said rocking axis and having their opposite ends terminating adjacent respective sill members and being rotatably supported by said sill members, said torsion rods further including means extending outwardly of said sill members interconnecting the free ends of the horizontal sections with respective opposite sides of said body, said means including inclined sections extending upwardly and outwardly from the longitudinal axis of said horizontal sections.

7. In a motor vehicle having a frame comprising a pair of longitudinally extending transversely spaced sill members interconnected by a pair of longitudinally spaced cross members; a vehicle body; means for supporting said body on said frame comprising first means pivotally connecting the forward end of said body to one of said cross members, said means being spaced substantially midway between said sill members; second means pivotally connecting the rearward end of said body to the other of said cross members, said second means being in longitudinal alignment with said first means whereby said body is capable of rocking laterally with respect to said frame about a longitudinal axis; means for yieldably resisting rocking of the body with respect to the frame including a pair of torsion rods, said rods having horizontal sections; common connecting means rigidly securing one end of each horizontal section to one of said cross members adjacent the second means pivotally connecting the rearward end of said body to said cross member, said horizontal sections extending divergingly from said common connecting means and having their opposite ends terminating adjacent respective sill members and being rotatably supported by said sill members, said horizontal sections being disposed at an angle with respect to said longitudinal rocking axis, said torsion rods further including means interconnecting the free ends of the horizontal sections with respective opposite sides of said body including inclined sections extending outwardly and angularly from said horizontal sections.

8. The combination as set forth in claim 7, in which said inclined sections are pivotally attached to the respective opposite sides of said body and shock absorbing means are provided for interconnecting said inclined sections to said frame.

References Cited in the file of this patent

UNITED STATES PATENTS

| | | |
|---|---|---|
| 325,609 | Hutchins | Sept. 1, 1885 |
| 433,026 | Perry | July 29, 1890 |
| 1,439,802 | De Miranda | Dec. 26, 1922 |
| 1,514,981 | Merville | Nov. 11, 1924 |
| 2,142,173 | Broluska | Jan. 3, 1939 |
| 2,164,838 | Porsche | July 4, 1939 |
| 2,173,973 | Leighton | Sept. 26, 1939 |
| 2,190,298 | Slack | Feb. 13, 1940 |
| 2,338,921 | Fiedler | Jan. 11, 1944 |
| 2,564,888 | Foley et al. | Aug. 21, 1951 |

FOREIGN PATENTS

| | | |
|---|---|---|
| 513,667 | Great Britain | Oct. 18, 1939 |
| 514,391 | Great Britain | Nov. 7, 1939 |